United States Patent
Asada et al.

(10) Patent No.: US 11,633,847 B2
(45) Date of Patent: Apr. 25, 2023

(54) SENSING AND CONTROL SYSTEMS

(71) Applicant: Massachusetts Institute of Technology, Cambridge, MA (US)

(72) Inventors: Haruhiko Harry Asada, Lincoln, MA (US); Jacob Guggenheim, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 326 days.

(21) Appl. No.: 16/827,289

(22) Filed: Mar. 23, 2020

(65) Prior Publication Data
US 2020/0326778 A1 Oct. 15, 2020

Related U.S. Application Data

(60) Provisional application No. 62/832,684, filed on Apr. 11, 2019.

(51) Int. Cl.
*G06F 3/01* (2006.01)
*B25J 9/16* (2006.01)
*B25J 9/00* (2006.01)
*B25J 13/02* (2006.01)

(52) U.S. Cl.
CPC .......... *B25J 9/0006* (2013.01); *B25J 9/1694* (2013.01); *B25J 13/02* (2013.01); *G06F 3/014* (2013.01); *G06F 3/017* (2013.01); *B25J 9/1656* (2013.01)

(58) Field of Classification Search
CPC ......... B25J 9/006; B25J 9/1694; G06F 3/014; G06F 3/017
See application file for complete search history.

(56) References Cited

U.S. PATENT DOCUMENTS

| | | | | |
|---|---|---|---|---|
| 8,924,020 B2* | 12/2014 | Kim | .......................... | B25J 9/16 901/46 |
| 9,891,718 B2* | 2/2018 | Connor | ................ | A61B 5/1125 |
| 10,362,989 B2* | 7/2019 | McMillen | ............. | G01L 1/2293 |

(Continued)

FOREIGN PATENT DOCUMENTS

WO   WO 2014/186546 A2   11/2014

OTHER PUBLICATIONS

Abdi et al., Control of a Supernumerary Robotic Hand by Foot: An Experimental Study in Virtual Reality. PLoS One. 2015;10(7):e0134501. Published Jul. 30, 2015. doi:10.1371/journal.pone.0134501.

(Continued)

*Primary Examiner* — Albert K Wong
(74) *Attorney, Agent, or Firm* — Wolf, Greenfield & Sacks, P.C.

(57) ABSTRACT

A system and a method for controlling a system are described. The system includes a plurality of sensors configured to be worn on a user's body. The plurality of sensors are configured to generate a plurality of signals in response to forces applied by corresponding portions of a user's body. The system also includes a processor configured to receive the plurality of signals. The processor is configured to identify commands from the user based at least partly on the plurality of signals and an operational range and/or null space of the plurality of signals for a task being performed by the user. The processor is configured to control an operation of the system based on the identified commands.

23 Claims, 5 Drawing Sheets

(56) References Cited

U.S. PATENT DOCUMENTS

| | | | | |
|---|---|---|---|---|
| 10,884,496 B2* | 1/2021 | McMillen | ............... | G06F 3/016 |
| 11,009,949 B1* | 5/2021 | Elias | ..................... | G06F 3/0414 |
| 11,144,121 B2* | 10/2021 | Wang | .................... | G06F 3/0346 |
| 11,147,510 B2* | 10/2021 | McMillen | ............. | G01L 1/2293 |
| 11,281,296 B2* | 3/2022 | Tachi | ........................ | G06F 3/01 |

OTHER PUBLICATIONS

Parietti et al., Independent, Voluntary control of Extra Robotic Limbs. IEEE. May 29-Jun. 3, 2017; 5954-5961.
Radmand et al., High-density force myography: A possible alternative for upper-limb prosthetic control. J Rehabil Res Dev. 2016;53(4):443-456. doi:10.1682/JRRD.2015.03.0041.

* cited by examiner

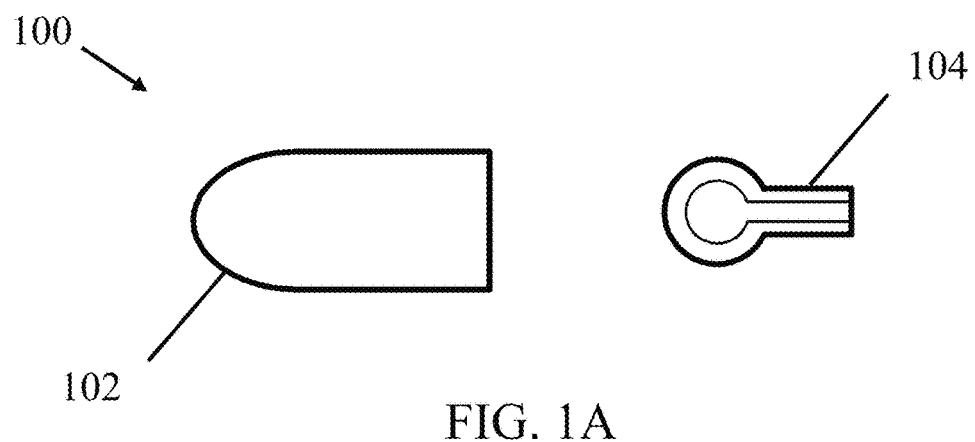
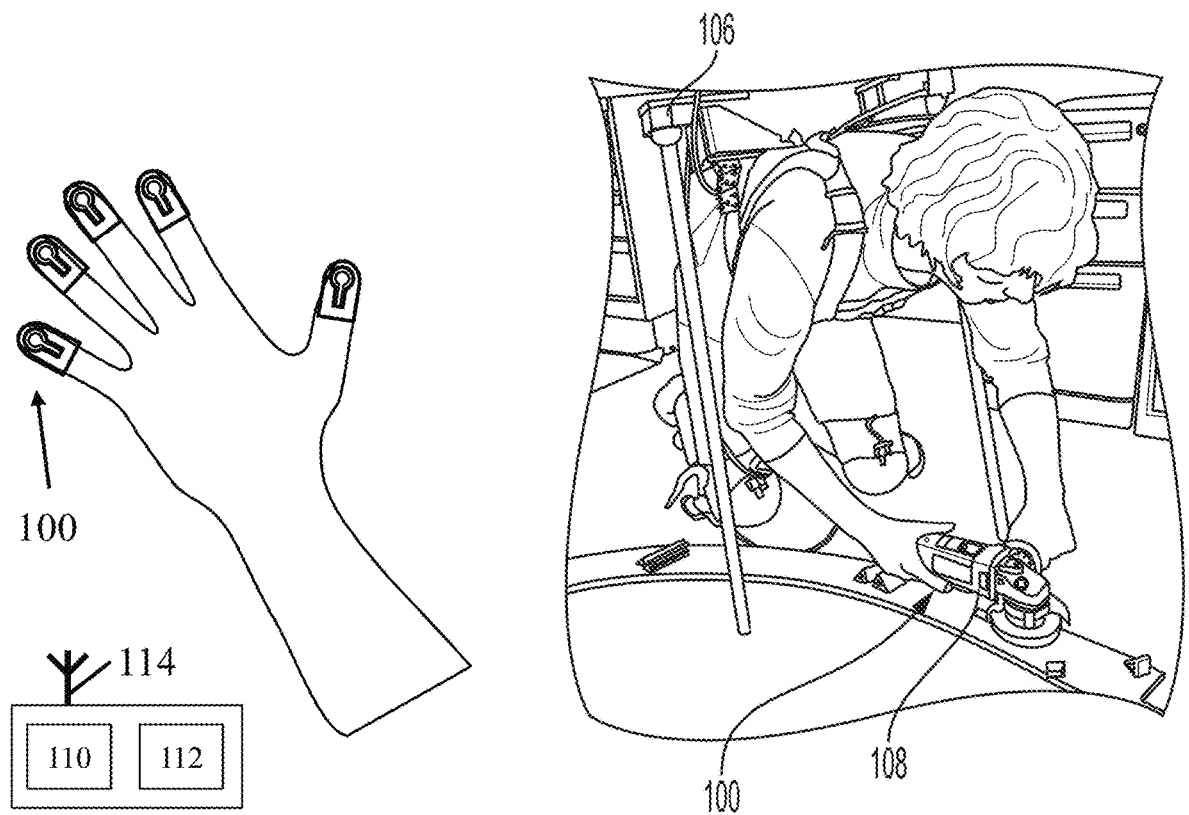
FIG. 1A
FIG. 1B
FIG. 2

SENSING AND CONTROL SYSTEMS

CROSS-REFERENCE TO RELATED APPLICATIONS

This application claims the benefit under 35 U.S.C. § 119(e) of U.S. provisional application Ser. No. 62/832,684 filed Apr. 11, 2019, the disclosure of which is incorporated by reference in its entirety.

FIELD

Disclosed embodiments are related to sensing and control systems.

BACKGROUND

A user interacting with a system may wish to provide commands to the system in a manner that is easy and intuitive. Past work on providing commands from a user to a system has focused on finding a physically independent signal, such as control architecture based on EMG signals. However, even when given a physically independent signal, the user may not be able to take advantage of the signal due to a cognitive bottleneck.

SUMMARY

In one embodiment, a system includes a plurality of sensors and a processor. The plurality of sensors are configured to be worn on a user's body and to detect forces applied by corresponding portions of a user's body. The plurality of sensors generate a plurality of signals. The processor receives the plurality of signals, and identifies commands from the user based at least partly on the plurality of signals. The processor identifies commands from the user based at least partly on an operational range and/or null space of the plurality of signals for a task being performed by the user. The processor controls an operation of the system based on the identified commands.

In another embodiment, a method for controlling a system includes receiving a plurality of signals from a plurality of sensors worn by a user, wherein the plurality of sensors detect forces applied by corresponding portions of a user's body. The method includes identifying commands from the user based at least partly on the plurality of signals and an operational range and/or null space of the plurality of signals for a task being performed by the user, and controlling an operation of the system based on the identified commands.

In yet another embodiment, a method for controlling a system includes: receiving a first plurality of signals from a plurality of sensors, wherein the first plurality of signals are associated with routine performance of a task; determining one or more command codes based at least in part on the first plurality of signals; receiving a second plurality of signals from the plurality of sensors during operation of the system; identifying the one or more command codes from the second plurality of signals; and controlling an operation of the system based on the identified command codes.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 1A is an exploded view of one embodiment of a sensor of a system;

FIG. 1B is a top view of one embodiment of a system that includes the sensor shown in FIG. 1A;

FIG. 2 shows one embodiment of a system being used in a task;

DETAILED DESCRIPTION

Figure 3A:
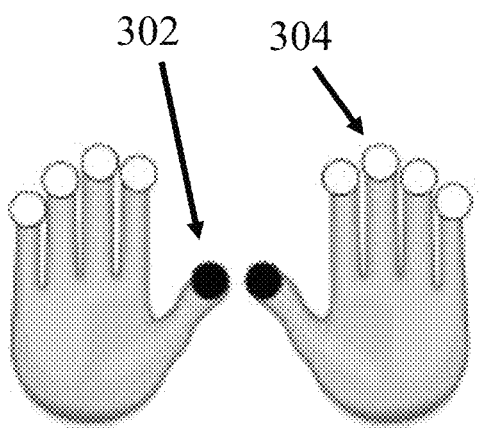
FIGS. 3A-3D show different arrangements of sensor activation for operation of a system.

As discussed above, a physically independent signal may not always be appropriate for providing commands to a system due to the difficulties associated with users providing separate independent commands when they are otherwise occupied with performing another task. Further, in instances where a system may be automatically controlled to some extent, while also accepting commands from a user, the criteria associated with selecting appropriate control input modalities for a user may also change. Accordingly, in some instances, rather than using a physically independent signal a user may separately operate, in some applications it may be desirable for a system to be controlled using one or more signals that may be provided to a system while a user is otherwise occupied in performing a task in a manner that is intuitive, repeatable, and voluntary.

In view of the above, the inventors have recognized and appreciated the benefits associated with systems that enable a user to provide commands to a system using the combination of forces applied by a plurality of body parts that may be otherwise occupied in performing a task. Specifically, commands may be provided by exploiting a type of redundancy in forces that the user may apply while engaged in performing one or more tasks. For example, a user may provide commands to a system through sensors disposed on the hands or other portion of the body even while the hands of the user are occupied in a task. In one such embodiment, if the task involves manipulating a power tool or other object, simply holding the power tool may use a minimum grasping force, where the grasping force may be the sum of forces generated by individual fingers. Accordingly, the sum of the forces may satisfy a certain condition, such as providing enough force to ensure that the power tool does not slip. However, the distribution of applied forces among multiple fingers may still be arbitrary. This implies that a user may still provide commands with a distribution of finger forces while holding, or otherwise interacting with, an object. This sensing of different combinations of forces applied by different portions of a user's body during performance of a task may, thus, permit a user to command a system using a signal that is intuitive, repeatable, and voluntary even while their hands, or other body portions, associated with one or more sensors are occupied.

In some embodiments, a system may need to identify commands from a user that may be distinct from the signals generated by the sensors during normal performance of a task. That is, the system may need to distinguish between task signals (i.e., sensor signals associated with nominal performance of a task) and command signals that the user may generate to command a system to perform a desired operation of the system while the user is performing the task. Accordingly, in one embodiment, a system may include multiple sensors located on a user's body. The multiple sensors may be configured to detect forces applied by corresponding portions of a user's body and generate multiple signals in response to those applied forces. A system may further include a processor that receives the multiple signals. Based at least in part on the multiple received signals, the processor may identify commands from the user using an operational range of the signals associated with nominal performance of the task as detailed further below.

In some embodiments, task signals and command signals may be distinguished after an appropriate calibration, initialization, or training period of the system. In the training period, the user may perform repeated executions of a given task, and the system may record the signals generated by the sensors. During the repeated executions of the task, only task signals may be generated. As such, the system may learn characteristics of the task signals associated with the given task to define an expected operational range of the signals during task performance. After the training period, when a user is performing the same task but may additionally wish to provide a command to the system, the system may be able to identify the command signals that may be superimposed on the task signals. That is, the user may intentionally apply signals outside of the expected operational range of the sensors in order to communicate commands to the system. Of course, embodiments in which a system is already calibrated with an expected operational range of signals associated with performance of a given task are also contemplated as the disclosure is not limited to how this range is established. Specific ways in which the operational range of signals generated during task performance used to identify commands from a user are discussed further below.

In the embodiments described herein, a system may be used generally to control one or more operations of any applicable system capable of being controlled by an input from a user. For example, a user may control a robot using the system. The robot could take any of a number of form factors, but supernumerary robotic limbs (SRLs) may be especially interesting. A user may be able to provide commands to the SRLs using sensors disposed on the user's hands, even while the user's hands are otherwise engaged. The commands communicated to the system may be general control commands related to motions, actions, or adjustments of the system. In addition, specialized commands may be useful. For example, a user may send a command to enable an emergency stop function to the system, even while the user's hands are constrained. Such an application has obvious benefits for user safety.

The multiple sensors of the systems described herein may be disposed at any location on the body of a user where a sensor signal may be manipulated. Humans have the most dexterous control of and most sensing feedback from their hands, as illustrated by large portions of the sensory and motor cortex devoted to the hands. Thus, one attractive solution may be to locate sensors on one or more portions of one or more hands of the user, including the fingers. Of course, other sensor locations are possible. Sensors may be located on any portion of a user's body that may change states that a sensor can sense. For example, sensors located on a user's shoulders may detect when the user shrugs their shoulders. Sensors located on a user's elbows may sense when a user extends their arms. Sensors may be located on a user's foot, ankle, knee, hip, shoulder, elbow, wrist, finger, or neck, to name a few examples. The multiple sensors of the system may be placed in any of a number of appropriate locations on the user's body, as the disclosure is not limited in this regard.

In some applications, sensor positions that constrain actions associated with certain tasks may be undesirable. For example, sensors located on the palms of a user's hand may interfere with grasping tasks. As such, in some embodiments, sensor locations may be chosen so as to be unobtrusive and limit any constraints or interference in a task caused by the sensors. For example, placing sensors on multiple fingertips of a user may provide a rich source of signals while not interfering with a task.

It should be understood that a system may use any appropriate sensor types for detecting commands from a user. For example, in the various embodiments described herein, the sensors may include one or more force sensors, pressure sensors, force sensing resistors, strain gauges, accelerometers, resistive sensors, capacitive sensors, combinations of the forgoing, and/or any other appropriate sensor configured to detect a force applied by a portion of a user's body. Other sensors that are not configured to detect a force are also contemplated. For example, sensors configured to detect position, light, sound, chemical concentration, or any other detectable quality may similarly be used in the system described herein. Accordingly, it should be understood that the disclosure is not limited to any particular type of sensor.

Depending on the particular embodiment, in some instances, signals generated by sensors may be analog or continuous signals. For example, a signal may track a continuous variable, such as a force applied at a fingertip. In some embodiments, the signals generated by the sensors may be digital or discrete signals. For example, a force threshold value may be set, such that a sensor that senses a force in excess of the force threshold signal may send a signal, while a sensor that does not sense a force in excess of the force threshold signal may not send a signal. In some embodiments, a continuous signal may be discretized into distinct segments. For example, a signal that is saturated or otherwise near one end of a continuous range of outputs may be associated with one command, while a signal that is zero or otherwise near an opposite end of the continuous range of outputs may be associated with a different command. Of course it should be understood that any appropriate type and/or combination of digital and/or analog signals may be transmitted from the plurality of sensors to an associated processor of the system as the disclosure is not limited to any particular sensor signal.

It should be understood that sensors may be attached to a user in any appropriate fashion. For example, the sensors may be integrated into wearable garments or structures, attached to a portion of a user's body with bands, attached with adhesives, and/or held proximate to a desired portion of a user's body in any other appropriate manner. In one such embodiment the sensors may be disposed on the fingertips of a user. In such an embodiment, the sensors may be integrated in the fingertips of a glove that is worn by the user. Alternatively, the sensors may be attached to a user's fingers using individual fingertip caps that are worn on individual fingers of the user. The fingertip caps may be elastic to allow unrestricted movement of the user's fingers. Elastic fingertip caps may be especially interesting in that elastic fingertip caps may use less material than a glove, and elastic fingertip caps may be conformable to various finger sizes and shapes of multiple users.

In some embodiments, a system may include a processor. The processor may be programmed, trained, or otherwise configured to identify commands from the user based at least partly on signals from multiple sensors of the system. As discussed above, a user engaged in nominal performance of a task may generate task signals associated with the task. For example, in a grinding task in which a user may be wearing sensors on their fingertips, the grinding task itself may require some force to be applied by the fingers of the user during the task. However, while there may be certain constraints associated with the forces applied to the sensors during performance of a task, the overall distribution and combination of forces among the fingertips, or sensors associated with other locations, during performance of a task may still be controlled within some range outside the expected combination of forces applied during nominal performance of the task. For example, in one embodiment, even though the sum of the forces generated by the fingers may be partially constrained, a user may communicate a command to a system by changing the distribution of the forces among the fingertips, applying forces greater than a threshold force to one or more fingertips, applying a combination of forces to a plurality of fingertips, and/or any other appropriate combination of force inputs to the sensors to communicate a command to a system. Thus, the system may identify commands from the user based at least in part on forces applied to individual sensors, a combination of the plurality of sensors, and a distribution of the forces at the fingertips.

In some embodiments, sensor signals associated with a task may need to be characterized in order to determine a nominal operational range of signals received from the sensors during performance of a given task. Thus, in some embodiments, an initialization or calibration may be performed for either an individual or a population of users who may perform the task. Depending on the embodiment, calibrating the operational range of the sensor signals may either be done once and stored in the memory of a system for subsequent usage, as might be done when a system is calibrated for use based on the operational range determined from a population of users, and/or the system may be calibrated each time the sensors are put on a user's body. In either case, sensor signals associated with nominal performance of a task, which may be referred to as task signals, may be characterized during one or more training executions of a task. A training execution of a task may include a user executing the task, and the system receiving and storing the task signals generated by the sensors. After repeated trials of training executions of the task, the system may have stored multiple task signals from multiple sensors over multiple trials.

As noted above, in some embodiments, training may be performed by a single user. This approach may be more personalized and more accurate for a single user who may operate a system. However, embodiments in which training may be performed by a population of users for general calibration and use of a system are also contemplated. Such an embodiment may be more easily implemented, and be more accurate, for use by a population of users that use a system at the expense of some accuracy for individual users within the population.

In some embodiments, at least a portion, and in some instances all, of the multiple task signals may be stored in a data matrix. Based at least in part on the operational range of the task signals, a range space of the data matrix may be defined corresponding to an operational range of the signals that may be associated with performing the task of interest. Any of a number of techniques may be used to define a range space of the data matrix. For example, the range space may be defined using any of a number of statistical techniques, including principal component analysis, and/or any other appropriate analytical technique capable of defining a range space that can be used to determine an operational range of signals associated with a user performing a particular task.

In some embodiments, a null space of a data matrix may be defined corresponding to a combination of sensor signals that lie outside of a normal operational range associated with performing a task. Any of a number of techniques may be used to define the null space of the data matrix. For example, the null space may be defined using any of a number of statistical techniques, including principal component analysis, and/or any other appropriate analytical technique capable of defining a null space of signals associated with a user performing a particular task.

Regardless of how a range space and/or a null space is determined for signals associated with performance of a particular task, the range space and/or null space may be used to identify signals associated with a nominal operational range for a task being performed by the user and signals that lie outside of a nominal operational range for performance of the task. Consequently, the range space may not contain information associated with user commands. The null space may be used to at least partly identify signals associated with user commands. Consequently, the null space may not contain information associated with the operational range of the plurality signals for a task being performed by the user.

While the use of a range space and/or a null space is described above for identifying commands to a system associated with signals from a plurality of sensors worn by a user, the current disclosure is not limited to using only this identification method. For example, other techniques may be used to identify user commands to a system from a plurality of sensors worn by a user, including, but not limited to, a partial least squares algorithm, a deep neural network classifier, and/or any other appropriate analysis technique as the disclosure is not limited in this regard.

In another embodiment, a command signal may be processed using a projection matrix. For example, a command signal may be projected into a space associated with an operational range of one or more sensors using a projection matrix. The distances between the projected command signal and any predetermined command codes may be measured using any appropriate distance metric. Based on the distances between the projected command signal and the command codes, the command signal may be classified as one of a number of commands. In some embodiments, a command signal may be classified as belonging to the command code closest to the projected command signal. In some embodiments, a projected command signal may be below a predetermined distance threshold from the closest command code prior to being determined to be a command code; otherwise, the command signal may not be assigned to any command code, and no command may be generated. The distance threshold may be selected based on a desired number of false positives and a desired number of false negatives, or other desired metric. For example, in a system in which the cost of issuing a command that was not intended by the user (i.e., in a system in which the cost of a false positive is high), a distance threshold may be set relatively low, so that projected command signals that are not close to a command code are unlikely to be interpreted as commands. Alternatively, in a system that seeks to avoid false negatives, a larger distance threshold may be implemented so that user intent is not mistakenly ignored. Distance thresholds may be determined using any suitable method. For example, distance thresholds may be tuned manually, or may be tuned using an algorithm. Tuning distance thresholds using an algorithm may include performing an exhaustive search, and/or defining a cost surface that places a large penalty on either false positives or false negatives and then performing gradient descent. Of course, other algorithms may be used to tune a distance threshold, as the disclosure is not limited in this regard.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1A is an exploded view of one embodiment of a sensor of a system. In this embodiment, a sensor 100 of the system may comprise a finger cover 102 and a force and/or pressure sensitive component 104. The force and/or pressure sensitive component may be a force sensor, a pressure sensor, a force-sensing resistor, or any other appropriate force and/or pressure sensitive component, as the disclosure is not so limited. The finger cover 102 may be a textile, an elastomer, or any other appropriate material that is sufficiently elastic so as to keep the finger cover positioned on a user's fingertip. The force and/or pressure sensitive component may be attached to the finger cover using any appropriate attachment method to form the sensor 100. For example, the force and/or pressure sensitive component may be sewn into the finger cover, attached to the finger cover using an adhesive, or integrated into the finger cover (e.g., the finger cover may be molded around the force and/or pressure sensitive component). Of course, other attachment mechanisms between the force and/or pressure sensitive component and the finger cover are possible as the disclosure is not limited in this regard. Further, as discussed above, other sensing modalities have been contemplated, and the disclosure is not limited to sensors disposed on a user's fingers.

FIG. 1B is a top view of one embodiment of a system that includes the sensor shown in FIG. 1A. The system may include a plurality of sensors 100. In some embodiments, a sensor may include a force and/or pressure sensitive component 104 and a finger cover 102. Each of the plurality of sensors may be disposed on a distal portion of a finger. Although only one hand is shown in FIG. 1B, additional sensors may be disposed on fingers of a user's opposite hand. Of course, in some embodiments, different types and positions of sensors may be combined with the sensors depicted in FIGS. 1A and 1B. For example, a system may include sensors that are disposed on distal portions of a user's fingers as well as additional sensors configured to detect motion of the user's shoulders. Thus, various combinations of sensor geometries and sensor locations are contemplated as the disclosure is not so limited. In the depicted embodiment, the system may also include a processor 110 and associated memory 112 corresponding to computer readable medium including processor executable instructions. The processor may be operatively connected to the plurality of sensors using any appropriate form of communication including wireless communication as illustrated by a wireless communication system 114 operatively connected to the processor. However, embodiments in which the processor is connected to the sensors using wired arrangements are also contemplated. In either case, the signals from the plurality of sensors may be received by the processor which may then execute instructions stored in the associated memory that when executed perform any of the various methods described herein to identify one or more commands from a user to control operation of one or more associated portions of a system.

FIG. 2 shows one embodiment of a system being used in a task. In this embodiment, a plurality of sensors 100 disposed on a portion of a user's body, which in this case are the fingertips of the user, may be used to control a system 106. In this case, the system may be a pair of supernumerary robotic limbs (SRLs). As a user's hands are occupied with performing a task with an object 108, the system 106 may aide the user in completing the task and/or performing any other desired operation. For example, the user may be engaged in a grinding task, which may involve the use of both hands to hold a grinding tool. As the user performs the grinding task, the pair of SRLs may support the user and keep the user in a steady position. The user may send commands to a processor of the SRLs without releasing the grinding tool, but rather by adjusting the distribution of forces applied to the grinding tool by the user's fingertips. The distribution of forces may be sensed by the plurality of sensors and may be sent to the processor. The processor may include look up tables, equations, a data matrix, a trained model, and/or any other appropriate method that may be used to define an operational range and/or null space associated with signals from the plurality of signals during performance of the task. Accordingly, the processor may compare the signals from the current grinding task with the expected operational range and/or null space of the signals for the desired task. The processor may then identify commands from the user based at least partly on the signals either being outside of an operational range and/or within a null space for signals associated with the sensors during performance of the task. For example, combinations of signals within an operational range may not be associated with a command, while combinations of signals within a null space and/or outside of an operational range may be associated with a command from the user to the system.

Figure 3B:
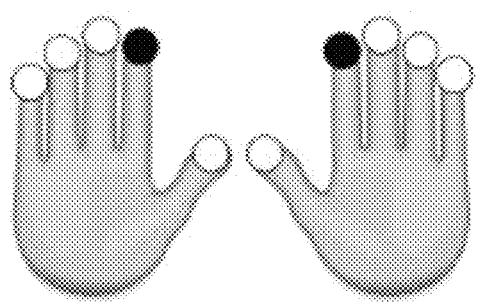
Figure 3C:
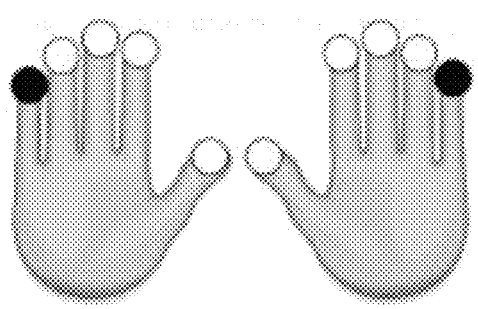
Figure 3D:
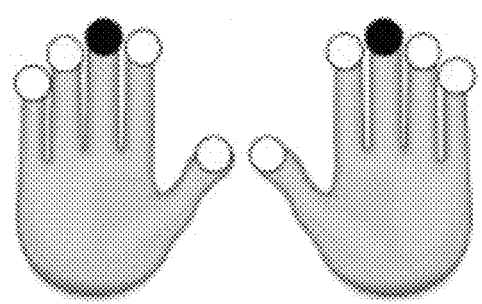

FIGS. 3A-3D show different combinations of sensor activations that may be used to provide operating commands to a system. In some embodiments, a sensor may be disposed on each fingertip of a user. Each sensor may be configured to be either "on" 302 (represented by a black circle in FIGS. 3A-3D) or "off" 304 (represented by a white circle in FIGS. 3A-3D). As described above, a sensor may be considered "on" when it produces a signal that is greater than a predetermined threshold. Of course, other embodiments in which continuous signals are used are contemplated, and the disclosure is not limited in this regard. In embodiments in which a user wears multiple sensors, the user may be able to turn each sensor "on" or "off" individually. Different arrangements of sensor activation (i.e., different combinations of which sensors are "on" and which sensors are "off") may be used to communicate different commands to a system. FIG. 3A shows a scenario in which both left and right thumb sensors are "on", and all remaining finger sensors are "off". This arrangement of sensor activation may correspond to a first command. FIG. 3B shows a scenario in which both left and right pointer finger sensors are "on", and all remaining finger sensors are "off". This arrangement of sensor activation may correspond to a second command. FIG. 3C shows a scenario in which both left and right pinky finger sensors are "on", and all remaining finger sensors are "off". This arrangement of sensor activation may correspond to a third command. Finally, FIG. 3D shows a scenario in which both left and right middle finger sensors are "on", and all remaining finger sensors are "off". This arrangement of sensor activation may correspond to a fourth command. While the above-described examples include two activated sensors, including one sensor from corresponding fingers of each hand, other arrangements of sensor activation are possible. In some embodiments, a command may correspond to one, two, three, four, five, six, seven, eight, nine, ten, or any appropriate number of activated sensors. In some embodiments, a command may correspond to asymmetric activation of sensors between two hands. For example, a code may correspond to a thumb sensor and a pinky sensor of a left hand being activated in combination with a middle finger sensor of a right hand. Thus, it should be understood that the current disclosure is not limited to any particular combination of activated sensors for communicating a desired command to a system as the disclosure is not limited in this fashion.

Figure 4:
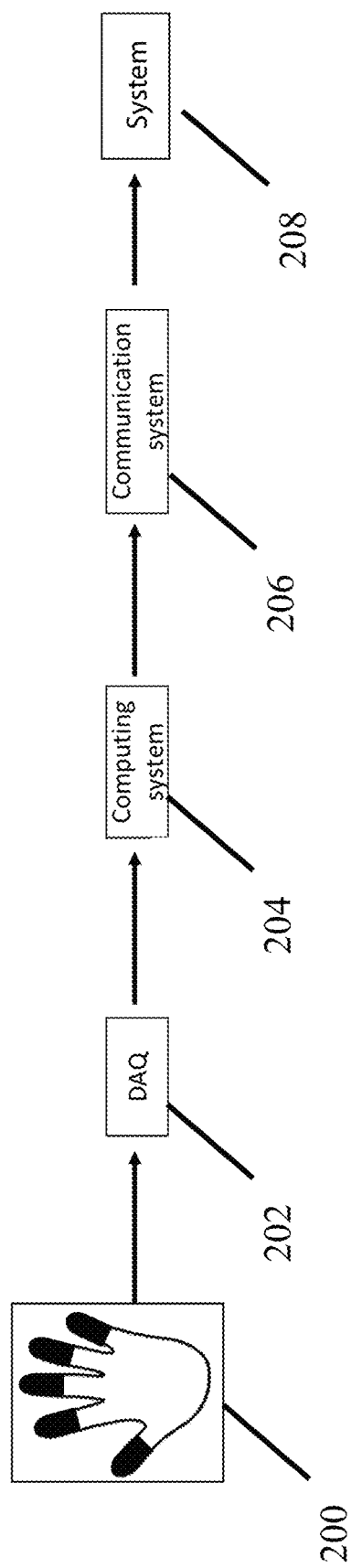
FIG. 4 is a flow diagram of one embodiment of a system.

FIG. 4 is a flow diagram of one embodiment of a system. At box 200, a plurality of sensors may generate a plurality of signals. Next, at box 202, the plurality of signals may be sent to a data acquisition (DAQ) device, which may perform some degree of signal processing. Then, at box 204, the processed signals may be sent to a computing system, in which the user's command may be determined from the processed signals by a processor. Afterwards, at box 206, the user's command may be transmitted to a communication system. Finally, at box 208, the communication system may send the user's command to a processor of the system to perform one or more operation based on the identified commands.

Figure 5A:
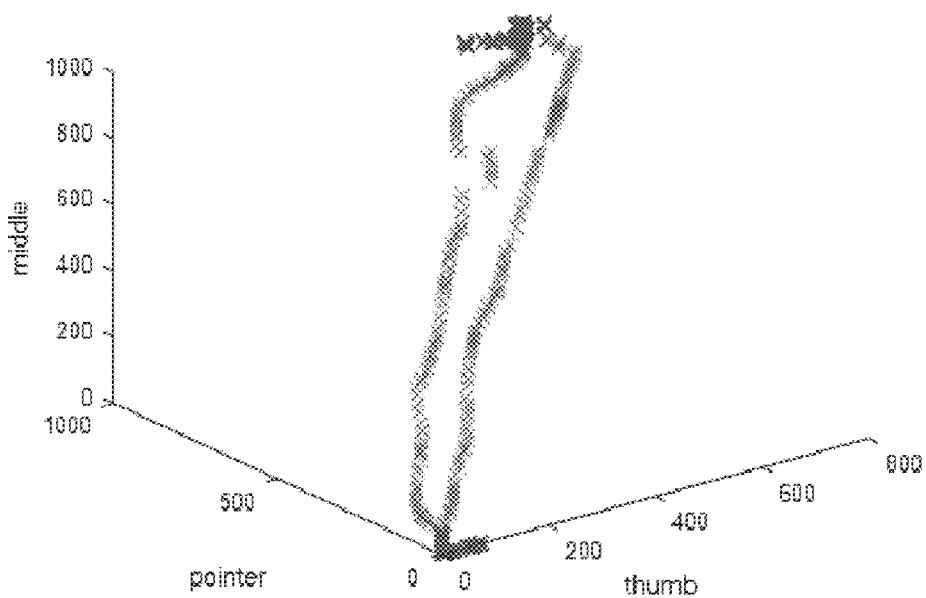
FIG. 5A is a graph of finger position data used to determine commands from a user in some embodiments of a system.

FIG. 5A is a graph of finger position data used to determine a user's commands in some embodiments of a system. This graph shows a plot of the signals recorded by sensors at a thumb, index finger, and middle finger of a user as the user completes a task. It is clear that the finger forces exerted by a user as the user executes the task may be described in a low-dimensional subspace. For example, a large percentage of the data may be able to explained with only two variables, even though the data exists in a three dimensional space.

Figure 5B:
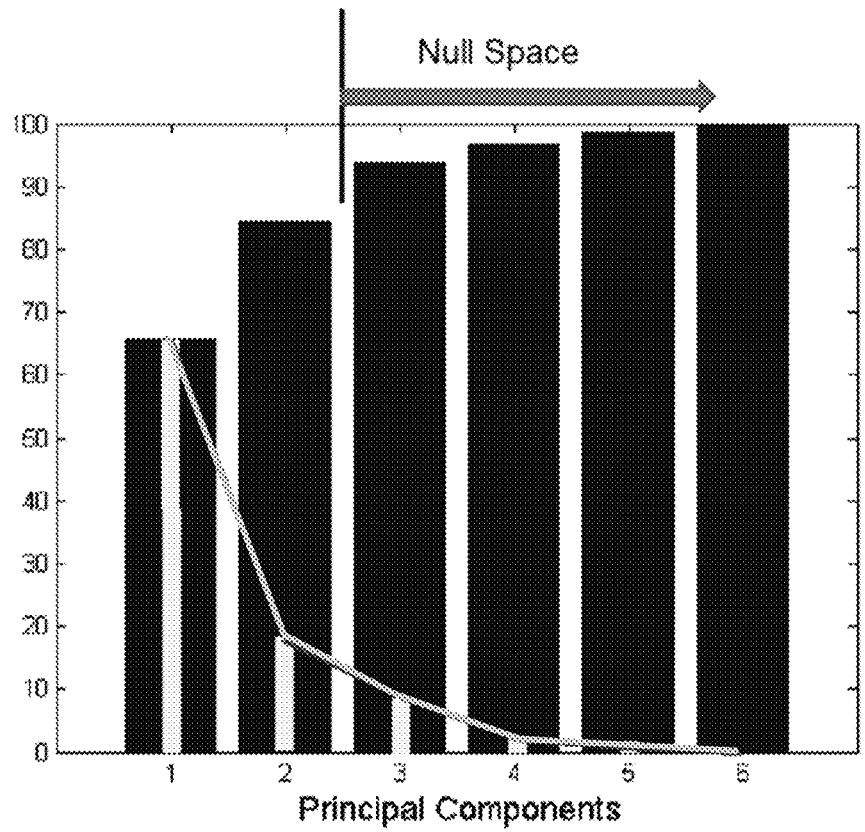
FIG. 5B is a graph that relates the principal components of a set of data to a null space of the set of data.

FIG. 5B is a graph that relates the principal components of a set of data to a null space of the set of data. The graph may be understood as being related to the data shown in FIG. 5A, although the graph is meant to be representative of a set of data in general. For example, the set of data graphed in FIG. 5B may be representative of signals generated by sensors disposed on the fingertips of a user. As can be seen by the large black bars in FIG. 5B, a larger percentage of the data may be able to be explained as more principal components are considered. For example, about 85% of the data may be explained using just two principal components. The small white bars indicate the marginal contribution from each additional principal component. For example, the third principal component may explain about 10% more of the data. Accordingly, if the operational range of the plurality of signals may be sufficiently understood using, for example, two principal components from the sensed signals, then the null space of the data may be described using the remaining principal components from the sensed signals.

Figure 6:
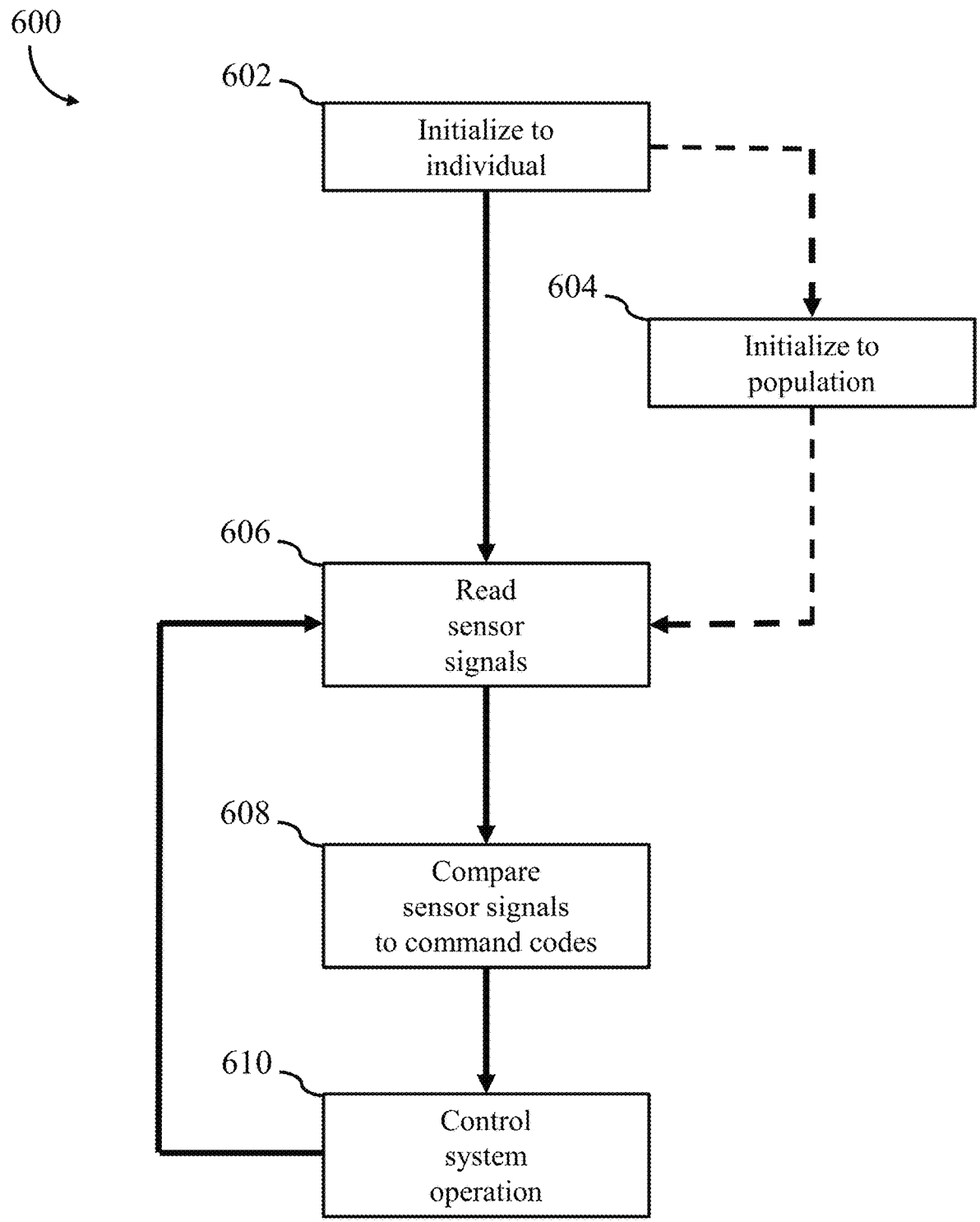
FIG. 6 is a flow diagram of one embodiment of a method for controlling a system.

FIG. 6 is a flow diagram of one embodiment of a method for controlling a system. At block 602, the system is initialized to an individual. Initialization may include placing sensors on various portions of the body of the individual, and having the individual perform a given task. The individual may be asked to perform the given task multiple times and/or in multiple different ways. As the individual performs the task during initialization, task signals from the sensors may be stored in the memory of a system and a processor associated with the memory may analyze the recorded task data recorded from the multiple sensors to determine a range of sensor signals associated with normal or baseline task performance. From the initialization data, a null space of normal task performance may be calculated, which may be associated with user inputs outside of the space of normal task performance. Initialization may also include defining command codes. Command codes may be defined to be in the null space of normal task performance. Optionally, at block 604, the system may be initialized to other individuals, thereby initializing the system to a population of users. Whether the system is initialized to a single user or a population of users, the method may proceed to block 606, where a processor of the system receives signals from the sensors as a user performs the given task. At block 608, a processor of the system compares the sensor signals to the command codes that were either defined during initialization and/or are preset command codes within the determined null space. If the sensors signals are determined as corresponding to command codes, the method proceeds to block 610, where the processor sends a command to control one or more operations of the system based at least in part on the determined command codes.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Example: Finger Code Communication

Using simple pressure sensor pads attached to the fingertips of a user or a pair of gloves that the user wears, forces at individual fingers were able to be measured. These sensor signals are multi-dimensional, producing a rich variety of signals. A naïve technique is to assign each finger force sensor to a specific ON-OFF signal, just like a shoulder shrug switch. This allows for communicating the same number of actions as the number of the force sensors. However, combinations of multiple sensor outputs may express a much larger set of signals. In other words, "command codes" can be defined as a combination of individual sensor outputs. As a pianist can express a variety of codes with ten fingers, this finger force sensor system allows for expressing a number of communication items. Moreover, the magnitude of finger force can be used for communicating continuous variables, such as distance, speed, and direction. By combining discrete patterns, or code, with analogue, continuous signals, a user can express a rich variety of signals to a system.

One challenge is how to distinguish intended command signals from the finger forces that a user applies during nominal performance of a task, such as holding and operating a tool. This can be clearly differentiated by analyzing data of finger forces measured from repeated executions of a given task. Here, the null space of the data matrix was used to identify commands communicated from a user. For example, the finger forces associated with the execution of a task may be confined in a specific subspace within the multi-dimensional vector space. From the covariance matrix of the data matrix, it is possible to identify the null space of the signal. Thus, if sensor signals defined within this null space are used to define one or more commands for a system, the commands may not be mistaken with the signals detected during normal execution of a task.

Using the above concept, it is possible for a user to express and communicate a rich variety of commands while both hands are busy holding a tool and, thereby, not available for operating switches and joysticks. Thus, "Finger Code Communication" may be implemented in a system by a user using wearable finger force sensors. Specifically, a user may issue a command to a system with a special combination of individual finger forces, but those finger force signals may need to be distinguished from the forces of unintended signals from performance of a task in which the user is engaged. While the user is executing their task, the user typically interacts with one or more objects (e.g., holds a tool with both hands), generating finger forces. In order to distinguish those forces from intended signals as well as to design a "command code" of finger forces, a data-driven approach is proposed by using data taken from the user performing the task(s).

Suppose that fingertip force sensors can measure fingertip forces at m fingers. Let $f_i$ be force at the $i^{th}$ finger. Collectively, m fingertip forces are represented as:

$$f=(f_1 \ldots f_m)^T \in \Re^m.$$

Suppose that a user demonstrates a task to be performed by using a tool. Finger forces are measured and labeled as $f^{(1)} \ldots f^{(N)}$. The covariance matrix of the data may then be computed:

$$C = \sum_{i=1}^{N} (f^{(i)} - \bar{f})(f^{(i)} - \bar{f})^T \in R^{m \times m}$$

The principal component analysis of the covariance gives a series of eigenvalues and associated eigenvectors in the descending order of magnitude:

$$\lambda_1 \geq \lambda_2 \geq \ldots \geq \lambda_k > 0, \lambda_{k+1} = \ldots = \lambda_m = 0, 1 < k < m$$

where integer k is the number of positive eigenvalues. Using the first k eigenvectors, the range space of the fingertip forces can be formed:

$$R = \langle v_1, \ldots, v_k \rangle$$

where $\langle \ldots \rangle$ represents that a sub-space is spanned by the vectors . . . . The null space is formed by:

$$N = \langle v_{k+1}, \ldots, v_m \rangle$$

The whole vector space is then divided into the range space and the null space.

$$V^m = R \oplus N$$

This implies that the fingertip forces are confined in the range space R while performing a task. In most cases, the first 3~4 principal components may explain 80~90% of the data. Truncating the components at a reasonable level, say k~4, leaves a large null space, which can be used for communication. Once appropriate command codes are defined within the null space based on individual and/or a combination of signals from the sensors, a user can communicate commands to a system while holding a tool, or interacting with other objects, by superimposing a particular combination of fingertip forces on the ones used for interacting with the object during normal performance of a given task.

The basic concept of the Finger Code Communication is generalizable. The concept can be applied to many human-machine communication problems, where a user is busy performing a task yet needs to communicate with the system at the same time. The proposed method using finger force sensors may be able to be used whenever and wherever the user touches a surface with their hands. The method may be ubiquitous in this sense.

Example: Distance Thresholding

Command codes may exist within the range space of the combined exploration dataset (i.e., the dataset gathered during system calibration) and task dataset (i.e., the dataset gathered during execution of a task). As described above, command codes may also exist within the null space of the task dataset. That is:

$$S = R \cap N_t$$

where S is subspace in which codes may be stored, R is the range space of the combined exploration and task datasets, and $N_t$ is the null space of the task dataset.

To determine if a new force measurement f* contains a command input, f* may be projected into S by constructing a projection matrix $P_S$ such that:

$$P_S * f* = f_S*$$

$$P_S = SS^T$$

where $f_S*$ represents the new force measurement projected into S. Then, $f_S*$ can be compared with any suitable distance metric to each predetermined command codes $c_i$ that exist within S to see if $f_S*$ matches one of the predetermined command codes. This analysis may take the form:

$$d(c_i) = \sqrt{(c_i - P_S * f*) \cdot (c_i - P_S * f*)}$$

$$\hat{c} = \begin{cases} \operatorname{argmin}_c d(c_i) \text{ for } d(c_i) < d_{thresh} \\ \text{no code for } d(c_i) > d_{thresh} \end{cases}$$

where $\hat{c}$ is the identified command and $d_{thresh}$ is defined as the maximum distance a particular command code can be away from a point for that point to be classified to that particular command code. The smaller the value of $d_{thresh}$, the fewer points that will be classified to that particular command code. In this way, accidental command triggers may be avoided. For example, one command code, such as a lessening of a force on the right thumb, may be been manually defined. The projected data from $f_S*$ may then be compared to the manually defined command code and classified using the Euclidean distance metric such that when a force measurement is sufficiently close to the manually defined command code, that force measurement is classified as that command code. The remainder of the force measurements may be classified as not containing command inputs.

What is claimed is:

1. A system comprising:
   a plurality of force sensors configured to be worn on a user's body and to detect forces applied by corresponding portions of the user's body; and
   a processor configured to:
      receive a plurality of force signals from the plurality of force sensors related to the user performing a task;
      determine if the plurality of force signals is within a null space and/or outside of an operational range of the plurality of force signals associated with performance of the task to identify commands from the user; and
      control an operation of the system based on the identified commands.

2. The system of claim 1, wherein the plurality of force sensors are configured to be worn on at least one hand of the user.

3. The system of claim 1, wherein the plurality of force sensors are configured to be worn on one or more fingertips of the user.

4. The system of claim 1, wherein the operational range of the plurality of force signals for the task being performed by the user is at least partially defined by a range space of the plurality of force signals associated with performing the task.

5. The system of claim 1, wherein the operational range of the plurality of force signals for the task being performed by the user is at least partially defined by the null space of the plurality of force signals associated with performing the task.

6. The system of claim 1, wherein the processor identifies commands based at least partly on a principal component analysis of the plurality of force signals.

7. The system of claim 1, further comprising at least one robotic limb, wherein the processor is configured to control an operation of the at least one robotic limb based on the identified commands.

8. A method for controlling a system, the method comprising:
receiving a plurality of force signals from a plurality of force sensors worn by a user, wherein the plurality of force sensors are configured to detect forces applied by corresponding portions of the user's body during performance of a task;
determining if the plurality of force signals are within a null space and/or outside of an operational range of the plurality of force signals associated with performance of the task to identify commands from the user; and
controlling an operation of the system based on the identified commands.

9. The method of claim 8, wherein at least a portion of the plurality of force sensors are worn on at least one hand of the user.

10. The method of claim 8, wherein at least a portion of the plurality of force sensors are worn on one or more fingertips of the user.

11. The method of claim 8, wherein identifying commands from the user includes comparing the plurality of force signals to a range space of the plurality of force signals associated with performing the task.

12. The method of claim 8, wherein identifying commands from the user includes comparing the plurality of force signals to the null space of the plurality of force signals associated with performing the task.

13. The method of claim 8, wherein identifying commands from the user includes performing a principal component analysis of the plurality of force signals.

14. The method of claim 8, wherein identifying commands from the user includes determining a projection matrix.

15. The method of claim 14, wherein identifying commands from the user includes:
determining a distance from the plurality of force signals to a command code based at least in part on the projection matrix, wherein the command code comprises a combination of forces in the null space; and
comparing the determined distance to a predetermined distance threshold.

16. The method of claim 8, wherein controlling an operation of the system comprises controlling an operation of at least one robotic limb.

17. A method for controlling a system, the method comprising:
receiving a first plurality of force signals from a plurality of force sensors, wherein the first plurality of force signals are associated with forces applied by corresponding portions of a user's body during performance of a task by the user;
determining a null space associated with the first plurality of force signals associated with performance of the task by the user;
defining one or more command codes based at least in part on the first plurality of force signals and the null space, wherein each command code of the one or more command codes comprises a combination of forces in the null space.

18. The method of claim 17, further comprising:
receiving a second plurality of force signals from the plurality of force sensors during operation of the system;
identifying the one or more command codes using the second plurality of force signals; and
controlling an operation of the system based on the identified one or more command codes.

19. The method of claim 18, wherein identifying the one or more command codes includes determining if the second plurality of force signals are within the null space and/or outside of an operational range of the first plurality of force signals associated with performance of the task.

20. The method of claim 18, wherein identifying the one or more command codes includes determining a projection matrix.

21. The method of claim 20, wherein identifying the one or more command codes based at least partly on the second plurality of force signals and the defined one or more command codes includes:
determining a difference between the second plurality of force signals to the one or more command codes based at least in part on the projection matrix; and
comparing the determined difference to a predetermined threshold.

22. The method of claim 17, wherein the first plurality of force signals and the second plurality of force signals correspond to forces applied by corresponding portions of the user's body.

23. The system of claim 1, wherein the plurality of force sensors are configured to detect a range of forces.

* * * * *